United States Patent [19]
Pornin

[11] 3,955,655
[45] May 11, 1976

[54] ADJUSTABLE LIQUID-OPERATED SHOCK-ABSORBER

[76] Inventor: René Pornin, Les Allees, Arthez-de-Bearn, France

[22] Filed: Dec. 16, 1974

[21] Appl. No.: 533,061

Related U.S. Application Data

[63] Continuation-in-part of Ser. No. 341,879, March 16, 1973, abandoned.

[30] Foreign Application Priority Data
Mar. 17, 1972 France .............................. 72.09344

[52] U.S. Cl. .............................. 188/313; 188/299; 272/130
[51] Int. Cl.² .............................. F16F 9/19
[58] Field of Search ........... 188/285, 286, 299, 313, 188/314, 318; 16/51, 52, 53; 272/79 C

[56] References Cited
UNITED STATES PATENTS
| | | | |
|---|---|---|---|
| 767,008 | 8/1904 | Pelletier et al. .................... | 272/79 C |
| 2,038,032 | 4/1936 | Flynn ................................. | 188/314 |
| 2,239,112 | 4/1941 | Nickelsen ......................... | 188/318 |

FOREIGN PATENTS OR APPLICATIONS
| | | | |
|---|---|---|---|
| 581,704 | 12/1924 | France ............................... | 188/313 |
| 1,242,946 | 6/1967 | Germany ........................... | 188/313 |
| 1,455,903 | 6/1969 | Germany ........................... | 188/318 |
| 472,010 | 8/1952 | Italy ................................... | 188/313 |
| 1,811 | 6/1907 | United Kingdom ................ | 188/313 |
| 1,264,446 | 2/1972 | United Kingdom ................ | 188/318 |
| 655,326 | 7/1951 | United Kingdom ................ | 188/313 |

*Primary Examiner*—Trygve M. Blix
*Assistant Examiner*—Edward R. Kazenske
*Attorney, Agent, or Firm*—Ostrolenk, Faber, Gerb & Soffen

[57] ABSTRACT

A liquid-operated tubular shock-absorber capable of exerting an adjustable force, comprises two concentric tubes fixed one inside the other with a narrow annular spacing between their walls, and a piston provided with a spindle sliding in sealing-tight relationship in the inner tube to define two chambers therein; in the end regions the spacing between the tubes communicates with both chambers inside the inner tube to form a closed circuit which is filled with liquid. A needle valve for regulating the flow of liquid are provided. The shock-absorber is particularly useful in physical training as a very reliable exerciser which operates in both compression and traction.

6 Claims, 5 Drawing Figures

ADJUSTABLE LIQUID-OPERATED SHOCK-ABSORBER

This is a continuation-in-part of application Ser. No. 341,879, filed Mar. 16, 1973 now abandoned.

BACKGROUND OF THE INVENTION

This invention relates to a tubular shaped shock-absorber of the liquid-operated type and having adjustable resistance to motion, which is suitable for various applications and particularly as a physical training appliance.

Numerous shock-absorbers are known and their manufacture has developed considerably with the growth of the motor vehicle industry. The problem of adjusting or regulating their resistance is not a simple one, however, and there are no known industrial shock-absorbers which can be adjusted or regulated very quickly and conveniently at any time. Furthermore, shock-absorbers of the specific type used with physical training appliances for the development and re-training of muscular power, as known heretofore, leave much to be desired. Rubber chest expanders or exercisers are adapted only to withstand traction and cannot offer any resistance to compression. In addition, they are dangerous because if they are suddenly released accidentally they may cause injury to the user. Also, the resistance offered by such exercisers is approximately proportional to their elongation, and this generally prevents the movement of the exerciser to the point of complete contraction of the user's muscle, and this is an important efficiency factor. Excessive elongation of the elastic medium in such exercisers beyond the elasticity threshold, produces slackening of the elastic fibre, which also undergoes progressive aging due to ordinary oxidation. Depending upon their construction, spring exercisers can offer resistance to traction or compression, but they have numerous disadvantages and dangers, including deformation and rapid slackening, dangerous spring-back if handled incorrectly. Furthermore, the risk of tearing cloth, yarn and the skin make it necessary to provide outer sliding tubes for protective purposes. The result is a rudimentary appliance which is non-adjustable, which has restricted use possibilities, and the use of which is dangerous.

Pneumatic appliances based on the principle of air compressibility have recently appeared on the market. These appliances represent some progress in the art but they have inadequacies bound up with the principle of compressibility in the same way as chest expanders and springs.

The invention provides an appliance without the above disadvatages, which is adapted to act as a readily adjustable shock-absorber in various conventional applications and to act as a physical training appliance of high reliability and efficacy, usable both under traction and compression. One of the outstanding properties of the novel appliance is its perfectly inert state of equilibrium in any position and the possibility of locking it rapidly in each of its positions. Consequently, unlike known exercisers, traction and compression forces can be released at any time during use of the appliance without any danger because it simply remains in the state of traction or compression at which it was released. Inter alia, this property opens up new applications to this novel shock-absorber, i.e., as a device for fixing doors, windows or other closure elements or any other means in any desired partially open position. For accomplishing these same purposes very simple, but inconvenient shift devices are known, as are complicated and expensive slide guide devices which are complex to handle. The shock-absorber according to the invention is simple and may be made in very much smaller dimensions so that it advantageously replaces these former devices. A quick turn of a screw enables the appliance to be locked to secure the required partial opening of a door, window or the like.

DESCRIPTION OF THE INVENTION

The liquid-operated, tubular shape shock-absorber according to the invention is comprised of two concentric casings fixed one inside the other and spaced a short distance apart. This spacing between the casings is partially blocked off to enable the liquid flow described below to occur. The space between the casings is so designed that it constitutes an exclusive communication between the two end regions of the internal space of the inner casing. A movable piston provided with a spindle is disposed for sliding in sealing-tight relationship within said internal space between the respective inlets of said communication into said end regions. The assembly is sealed with respect to the outer atmosphere, while its inner spaces are filled with a non-compressible liquid.

Hereinafter, the movable piston having the spindle is referred to as the main piston.

Consequently, a liquid introduced into the internal space and the open space between the casings is displaced by the main piston in either direction through the said communications in the end regions and through the open space between the casings and returns to the inner casing on either side of the piston. The pressure loss of this circuit represents the resistance offered by the piston to the force which tends to move it. Since this pressure loss depends on the section of the circuit, particularly the section of the open space between the walls of the two concentric casings, and the viscosity of the liquid used, the force of the shock-absorber can be pre-set by appropriate choice of these two characteristics. The force to be overcome thus arises from the controlled throttling of an incompressible fluid set in motion by the piston.

According to a preferred feature of the invention, means for regulating the flow of liquid are interposed in at least one place in the liquid circuit. More particularly, said means comprise a needle valve or other valve fixed to one of the common ends of the two concentric casings.

In one preferred embodiment, a stop limits the travel of the piston to a certain distance from the end of the inner casing so as to form an expansion chamber in which another free piston without a spindle slides. This chamber is intended to compensate for changes in capacity due to the introduction and withdrawal of the spindle of the main piston during operation of the appliance.

Also, it is advantageous to provide the outer end of the expansion chamber with a closable and preferably adjustable communication with atmosphere.

Of course suitable gaskets are provided in the relatively moving parts to ensure that the assembly remains perfectly sealed. Thus gaskets are provided for sealing purposes at the place where the movable spindle of the main piston extends through the closure for the end of the inner casing.

Any known means, for example joints, plates, bolts, threaded rod systems, etc., may be used to connect the end of the spindle on the one hand and the opposite end of the casings, on the other hand, to the devices or places of use. When the appliance is intended for physical training, such means are generally handles, yokes, rings, etc.

It is usually advantageous, for reasons of strength, protection, appearance, etc., to enclose the assembly in a thin casing connected to the spindle of the main piston; said spindle is therefore protected by the third casing during its movements and only the casing is visible from outside. The shock-absorber is then in the form of a system of sliding casings: the two concentric casings sliding in the third, the utilization means such as handles, yokes, plates, or the like are attached to the end of the third casing. It is the object of the invention to provide an improved shock absorber, which has an inert state of equilibrium at any tractive or compressive position.

One very advantageous but non-limitative embodiment of the invention particularly useful for application as an exerciser for the development or re-training of the muscles is described in detail hereinafter. The appliance is illustrated in the accompanying drawings.

DETAILED DESCRIPTION OF A PREFERRED EMBODIMENT

Figure 1:
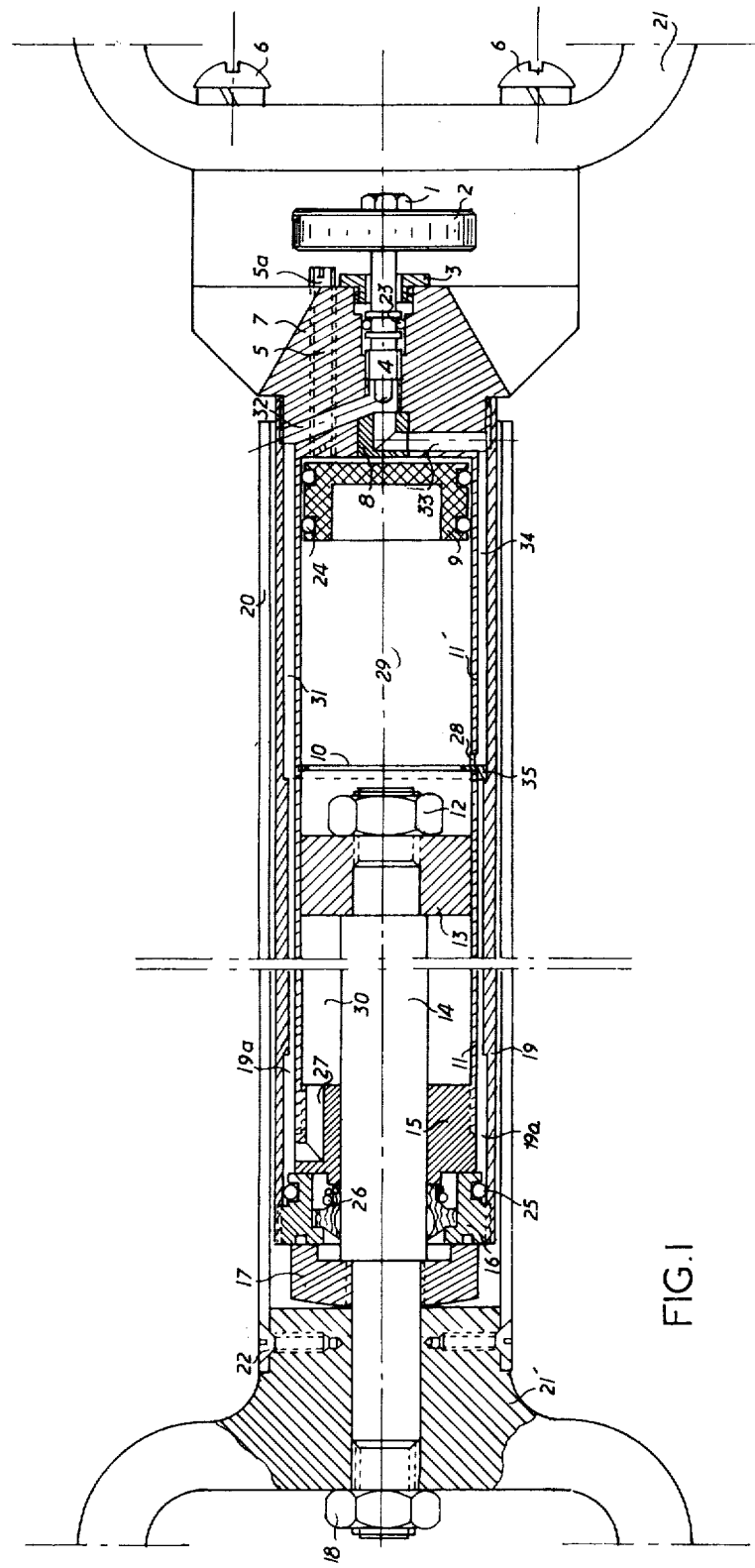
FIG. 1 is an axial cross-sectional view of the two end regions of an appliance according to the invention, the central part of which has been omitted for the sake of simplification.

The main parts of the shock-absorber are: an outer cylindrical tube or casing 19, a similar tube or casing 11 and its extension 11' secured by conventional means (not shown) concentrically to the inside of tube 19, and a piston 13 sealingly slidable within and along tube 11, the piston being secured to the end of a movable spindle 14 by means of a nut 12. A narrow annular longitudinal space 19a exists between the tubes 19 and 11, but does not extend between tube 19 and tube extension 11'.

In the wall of tube extension 11' a groove or duct 31 is provided which extends longitudinally, i.e., in the axial direction, and forms a rather narrow passage or space between the two casings 19 and 11'. See the region of the device shown in FIG. 2 and in the upper right-hand part of FIG. 1. The duct or space 31 communicates through a channel 32 with the inner or needle side of a valve 4. Channel 32 is connected by a channel 33 with a groove, duct or conduit 34, similar to duct 31, and also formed in the tube extension 11', as shown in the lower part of FIGS. 1 and 2. At the left end of duct 34 the wall of tube extension 11' is passed through by an opening 28 leading to the inner space 29 of tube extension 11'. A conduit is defined by channels 32, 33, duct 34 and opening 28. Just beyond opening 28, the duct 34 is closed by seal 35, which means that there is no communication between duct 34 and the annular space 19a located between tubes 19 and 11, and at the left of seal 35, in FIGS. 1 and 2. Inner space 30 on the other side of piston 13 communicates through duct or conduit 27 with space 19a.

Thus the only passage available between the inner spaces 30 and 29, on both sides of piston 13, is through a passage defined by elements 27, 19a, 31, 32, 33, 34 and 28. Both the spaces 29 and 30 and the above passage are filled with a suitable liquid of appropriate viscosity, particularly oil.

The spindle 14 slides in a bore extending through a stop 15 screwed into the left-hand end of the inner tube 11. The stop acts as a closure for the tube 11. It is sealed on the spindle by means of the gasket 26 mounted behind the stop 15 in a support 16, the periphery of which is secured to the inner wall of the outer tube 19. A ring gasket 25 is also provided between the support 16 and the wall 19.

Beyond the gasket support 16 is a stop 17 secured to the spindle 14 to limit the travel of the piston 13. This stop may, if required, be simply a washer, which is relatively flexible, and may be formed, for example, of a plastic material such as polyethylene or rubber.

Figure 2:
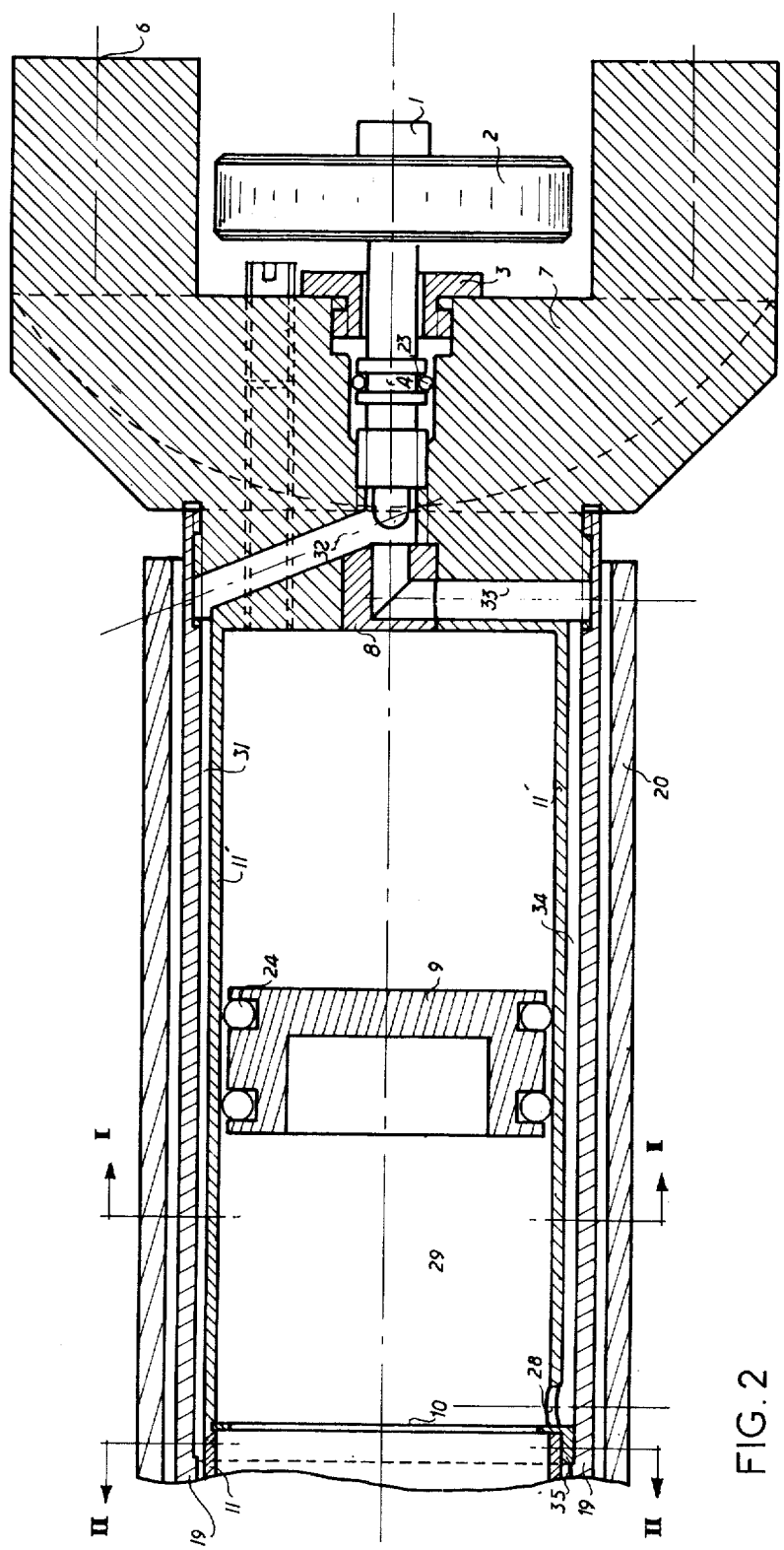
FIG. 2 is a cross-sectional view similar to that of FIG. 1, but on an enlarged scale, showing the right hand end of the appliance.
Figures 3, 4, 5:
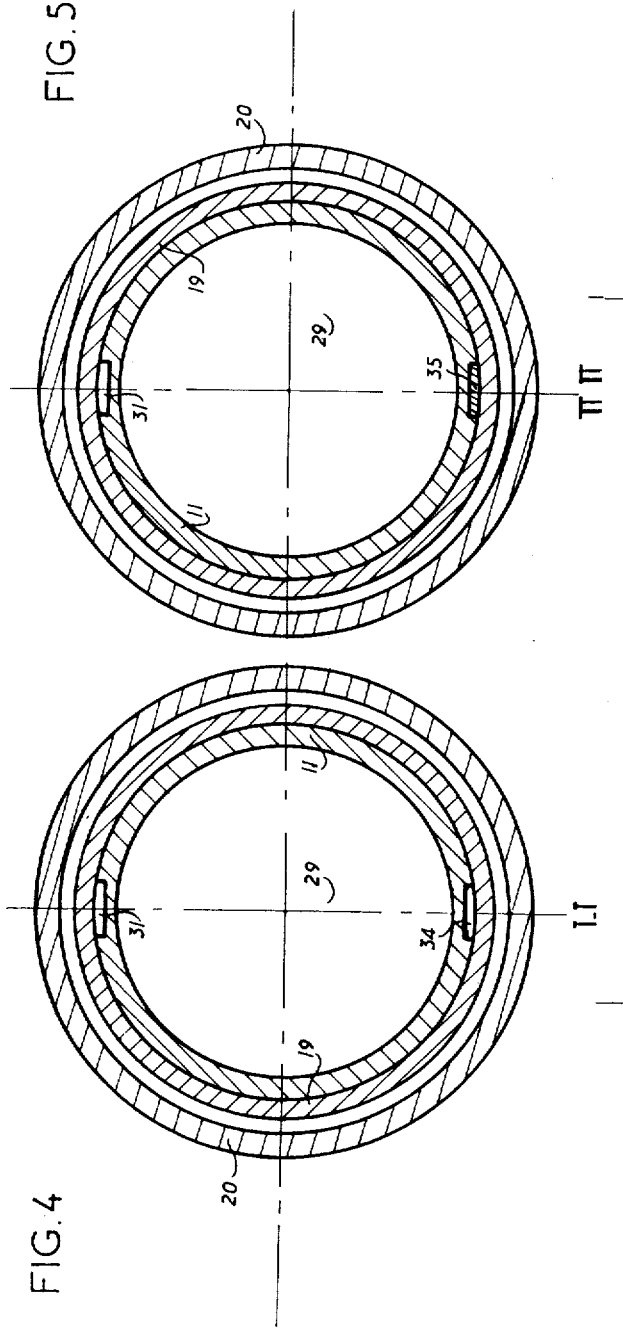
FIG. 3 is an axial cross-sectional view along a plane perpendicular to the plane of view of FIG. 2, and showing only a region situated-about the plane I—I of FIG. 2.
FIG. 4 shows a transverse cross-sectional view of the appliance along a plane determined by the plane I—I in FIG. 2.
FIG. 5 is a transverse cross-sectional view similar to that of FIG. 4, along a plane determined by the plane II—II of FIG. 2.

In the extension 11' of tube 11, FIG. 2 and the right-hand part of FIG. 1 show the expansion chamber 29 in the casing 11'. Casing 11' in this case is integral with a regulator 7. The casing or tube extension 11' is connected at its left-hand end in FIGS. 1 and 2 to the tube 11 by means of a washer 10 that is open at the center. Casing 11' terminates in the body of the regulator 7, which also closes the tube 19 which is fixed thereto.

A free piston 9 is slidable inside the chamber 29 and is mounted on ring gaskets 24 which seal piston 9 relatively to the walls of casing 11'. FIGS. 1 and 2 show the piston 9 in two different positions. Behind the piston 9 and extending through the body 7 is a vent 5 which leads to the interior of the chamber 29. Communication between the vent 5 and atmosphere is controlled by a regulating screw 5a.

The regulator 7 comprises a valve needle 4, through whose seat 8 extends the duct 33. By turning the knurled knob 2 held by the locking screw 1, it is possible to open or close the passage from conduit 32 to conduit 33 to a greater or lesser extent, thus regulating the flow of liquid in the circuit having elements 29, 28, 34, 33, 32, 19a, 27, and 30. The needle is fixed in the body 7 by means of a nut 3 and sealed by a ring gasket 23.

FIG. 1 also shows the screws 6 for fixing gripper means, e.g., a handle 21, to the body 7.

The device described is surrounded by a third casing formed by a tube 20, to which a handle 21' is fixed on the left-hand end in FIG. 1 by screws 22. The end of the movable spindle 14 is connected to the said handle 21' by means of a nut 18.

Consequently, during operation, the tube 20 with the handle 21', which is joined to the spindle 14 bearing the piston 13, slides relative to the tubes 11, 11', 19 held by the member 7, and to the handle 21.

If a pull is exerted on the handles 21, 21', tending to move them apart, the main piston 13 moves to the left in FIG. 1 and may contact the closure 15, while the handle 21' driving the tube 20 and the spindle 14 move away to the left of the support 16. During this movement the liquid in the space 30 is driven to the rear of the piston 13, and then via duct 27 to the annular space 19a, and then to the front of piston 13 via ducts 31, 32, 33, 34 and the passage 28. In other words, the work of such traction takes the form of a flow of liquid from the rear to the front of the main piston.

However, this operation involves a certain negative pressure inside the appliance due to the reduction of the solid volume occupied by the body of the spindle 14, offering the liquid a greater total space than the volume of said liquid occupied initially. This change in available volume for liquid is automatically compensated for by an entry of a corresponding volume of atmospheric air through the vent 5, which moves the free piston 9 to the left in FIGS. 1 and 2 toward or as far as the washer 10.

The same work — but in the opposite direction — is effected if the handles 21, 21' are pushed toward one another starting from the retracted position, i.e., piston 13 on stop 15 and piston 9 near to washer 10. The resistance of the liquid then has to be overcome to transfer it again from space 29 to space 30 via passage 28, ducts 34, 33, 32, 31 and 27, from the front to the rear of the piston 13. Thus when the appliance is used in physical training, the same force will have been overcome first in traction and then in compression.

In this latter operation unlike the former, an excess pressure would tend to occur since the body of the spindle 14 being reintroduced into the space 30 takes up some of the volume that would have been available to the liquid. The compensating system according to the invention, i.e., chamber 29—piston 9—vent 5, obviates all this as in the traction stage. The thrust of piston 13 causes the piston 9 to move back to the right in FIG. 1 of the chamber 29 to the position shown in FIG. 1 and the air which is behind the piston 9 is expelled via the vent 5.

The compensation may be regulated by regulating the screw 5a acting on the entry or exit of the air through the vent 5.

Thus the flow of the liquid may occur in either direction without any disturbance of the pressures as a result of the compensation system. This system may alternatively use a compensating device other than the chamber 29—piston 9—vent 5 combination described by way of a preferable embodiment. Thus, it may be formed by a resilient diaphragm of rubber, or the like, a foam plastic, e.g., flexible polyurethane, or any other equivalent means. When a relatively resilient diaphragm is used as the compensator, it may simply replace the piston 9 or be mounted as a separator between the space 30 and a chamber for air or another gas replacing the chamber 29.

As already explained hereinabove, the force to be overcome, i.e., the pressure loss in the liquid circuit, can be rapidly regulated by means of the knurled knob 2, thus increasing or reducing the width of the passage from duct 32 to duct 33 via the needle valve 4-8.

In a preferred embodiment of the shock-absorber, the handles 21, 21' or other gripper means are rapidly detachable and replaceable by others. In the physical training application, this allows quick change from arm exercise to leg exercise, or vice-versa.

The presence of the compensator enables the appliance according to the invention to have a perfectly inert equilibrium. To move the piston 13 from one position to another, the resistance to the flow of liquid has to be overcome. But, once it is in its new position, the piston remains there without any tendency to move of its own accord in either direction. The valve 4-8 is then simply closed completely to lock the shock-absorber in the required position. This advantage provides for various novel applications of the appliance according to the invention, and particularly the above-mentioned adjustment of the partially open position of doors, windows, dampers or other closure means.

While free floating pistons with one side communicatng with the atmosphere are known in the art, for instance British Pat. No. 1,264,446, they were not mounted and used as in the present invention. Thus, in the British Patent the free floating piston acts itself in retarding the movement of a working piston, while the compensation for volume changes in the system involved is assured by bellows. In contradistinction thereto, according to the present invention, the retarding is produced exclusively by passing a less viscous or a more viscous liquid through the special space or duct 19a, 31, et al between casings, 19 and 11, 11'. The free piston 9 serves here as volume compensating means only in place of the bellows used in the above British Patent. As a result, in the prior art, the retarding action begins only a certain time after the working piston (valve member) moves rapidly. It begins when the free floating piston engages a stroke limiting member. That means that the resistance opposed to the working piston is not constant over time. On the contrary, in the system according to the invention, with given dimensions of the ducts leading from chamber 29 to chamber 30, and a liquid of given viscosity, the resistance is the same at any moment of operation.

The appliance according to the invention may be constructed with various dimensions appropriate for each particular purpose. When physical training is contemplated, it is very advantageous to give the various ducts such transverse or cross-sections that the ratio of this cross-section to the transverse or cross-section of chamber 29 is:

0.0009 to 0.01 and preferably about 0.005 for the grooves or ducts 19a, 27, 31 and 34;

0.0025 to 0.25, preferably about 0.01 as concerns the vent 5, the liquid being an oil having approximately 1 to 6 poises viscosity.

I claim:

1. A liquid operated shock absorber, comprising: a sealed external casing; a sealed internal cylindrical casing fixed within said external casing, and spaced therefrom to define a longitudinal space between the inner wall of the external casing and the outer wall of the internal casing; said internal casing having opposite first and second ends and a first and a second end region near the respective said end; a main piston in continuous liquid sealed engagement with and located in said internal casing and dividing said internal casing into first and second chambers which are, respectively, on the sides of said piston facing said first and second ends of said internal casing; shifting means for shifting said sealed piston along said internal casing between said end regions; said shifting means for shifting said piston comprises a spindle attached to said piston and extending away from one side of said piston and through said first chamber of said internal casing and sealingly passing through said first end of said internal casing, whereby said spindle occupies volume in said internal casing first chambers; a first conduit passing through said internal casing at a location in said first end region and joining said internal casing first chamber with said longitudinal space between said casings; a second conduit passing through said internal casing at a location in said second end region and joining said internal casing second chamber with said space; said shifting means shifting said piston but not past said locations at which said first and said second conduits pass through said internal casing; and means in said internal casing for blocking said piston from moving past these said locations; a continuous, open, flow path being defined between said first and said second chambers, through said first conduit, said longitudinal space and said second conduit, such that flow can be in either direction through said flow path without overcoming any spring biased pressure resistance to flow in either direction; flow regulating valve means in said flow path for selectively closing off said path to the same predetermined extent to flow in either direction; said flow path being interruptable only by said valve means for purposes of controlling flow; said valve means being capable of fixed positioning, without being shiftable due to pressure variations in said flow path; volume compensation means in liquid sealed engagement with and located in said internal casing second chamber for adjusting the volume of said second chamber according to variation in the volume of said first chamber due to said spindle moving in and out of said first chamber through said internal casing first end.

2. A shock absorber according to claim 1, further comprising a vent communicating from atmosphere outside said external casing to inside said internal casing second chamber at the side of said volume compensation means away from said piston; said second conduit communicating with said internal casing second chamber only at the other side of said volume compensation means.

3. A shock absorber according to claim 2, wherein said volume compensation means comprises a piston freely, sealingly slidable through said internal casing second chamber.

4. A shock absorber according to claim 1, further comprising a third guide casing external to said external casing and movable with respect thereto; said spindle passing through said internal and said external casings and being affixed to and movable with said third guide casing.

5. A shock absorber according to claim 1, further comprising: first connecting means connected to said spindle external to said external casing; said spindle passing through said internal and said external casings; second connecting means connected to said internal casing second end.

6. A shock absorber according to claim 1, wherein said chambers and said conduits are generally completely filled with liquid, whereby the shock absorber is liquid operated, not gas controlled.

* * * * *